United States Patent [19]

Wu

[11] Patent Number: 5,073,153
[45] Date of Patent: Dec. 17, 1991

[54] CHAIN

[76] Inventor: Chia L. Wu, No. 734, Chung Shan Rd., Kuei Ren Hsiang, Tainan Hsien, Taiwan

[21] Appl. No.: 671,359

[22] Filed: Mar. 19, 1991

Related U.S. Application Data

[63] Continuation-in-part of Ser. No. 637,293, Jan. 3, 1991.

[51] Int. Cl.⁵ ............................................. F16G 13/00
[52] U.S. Cl. .................................... 474/206; 474/212
[58] Field of Search ............. 474/206, 209, 212, 213, 474/226, 230

[56] References Cited

U.S. PATENT DOCUMENTS 4,741,725  5/1988  Ingold .................................. 474/212
4,978,327  12/1990  Wu .................................. 474/230 X

*Primary Examiner*—Thuy M. Bui
*Attorney, Agent, or Firm*—Poms, Smith, Lande & Rose

[57] ABSTRACT

A chain is a combination of a plurality of links, each link comprising a pair of outer and inner chain plates and rollers, each chain plate being dumbbell shaped and providing an inclined surface along an upper and lower edge of an inner surface thereof, from one lateral end to another. The inclined surface has a blade portion with a greater slope in a central straight portion of the chain plate, the inner chain plate further providing an inward projection on an innermost central portion thereof.

3 Claims, 5 Drawing Sheets

CHAIN

REFERENCE TO RELATED APPLICATION

This application is a continuation-in-part of U.S. patent application Ser. No. 07/637,293, filed Jan. 3, 1991, to the same inventor herein and entitled, AN IMPROVED CHAIN.

BACKGROUND OF THE INVENTION

This invention relates to an improved chain, especially to a chain used on a mountain terrain bicycle.

Typically, a multi geared mountain terrain bicycle has a plurality of sprocket wheels and a gear cluster connected by a chain and controlled by a rear and a front derailleur. The chain is linked by a plurality of links each composed of a pair of inner chain plates, outer chain plates, rollers, and a chain pin. Because of the requirement for strength, a distance between any two inner chain plates is restricted to a certain width. However, a standard sprocket or gear has specifications in thickness. It is noted that the distance between two inner chain plates is larger than a width of the sprocket, and when a tooth of a sprocket is inserted between the inner chain plates, a large gap still remains.

Since the gap allows a lateral movement of the chain against the gear cluster or sprockets, an unfavorable condition results: the sprocket may not be allocated on a central line of the chain, i.e., a biased condition, such as shown in FIG. 8, wherein A and B indicate a central line of a link 80 and a sprocket 90, respectively. When the chain is guided to a desired sprocket by the rear derailleur as a rider is shifting, the derailleur has to move the biased chain a distance before shifting can occur. Further, if the derailleur moves the chain too much to align with the desired sprocket, the chain easily falls onto an adjacent sprocket with a large diameter and then skids down to the desired sprocket. Such an up and down motion of the chain causes damage to the chain itself by a twisting force occurring in the motion. Also, as the rear derailleur is quickly driven, the motion of the chain caused by an misalignment increases loading of the rear derailleur, thereby increasing the possibility of damaging the derailleur. As a result, the expected life of the chain and derailleur are reduced.

When a rider is riding on a sloped rugged area at a high speed, the chain vibrates in a vertical and a horizontal direction. A force caused by vertical vibration is absorbed by guide wheels of the rear derailleur, springs, and the tire. However, since the gap existing between the inner chain plates and the sprocket cooperates with a lateral force produced by a horizontal vibration, the chain engaged with a sprocket is easily disengaged with the sprocket to automatically "jump" to an adjacent sprocket. Since the rear derailleur is not displaced and still remains in an original position, the rear derailleur and the chain are easily damaged by the resulting twisting force. That is very dangerous to the rider.

It is the purpose of this present invention, therefore, to mitigate and/or obviate the abovementioned drawback in the manner set forth in the detailed description of the preferred embodiment.

SUMMARY OF THE INVENTION

This invention provides an improved chain which is a combination of a plurality of links, each link has a pair of rollers, a pair of inner chain plates, and a pair of outer chain plates.

Each chain plate is dumbbell shaped and provides inward inclined surfaces along an upper and lower edge thereof. At a central straight portion of the chain plate, the inclined surface is broader and provides a blade portion having a greater slope adjacent to an edge of the central straight portion of the chain plate. One of the outer chain plates provides an inward central chain pin on a circular portion thereof, while the other chain plate provides corresponding receiving holes therein. Each inner chain plate has a hole surrounded by an inward flange on a center of each circular portion thereof and a projection on a central portion of an inner face thereof and a recess on an outer surface thereof corresponding to the projection.

Thus, after combining all of the above elements, a link of the chain will be provided a curved surface, and an inlet width between two inner chain plates will be larger than that of a traditional chain. An innermost width between two inner chain plates is slightly larger than a thickness of a sprocket such that a sprocket may be engaged approximately in alignment with a center line of the chain. Even in a highest gear ratio condition, the tooth engaged in a pair of inner chain plates will be guided to a next link, which will be engaged, to align with the sprocket to prevent a skidding-off condition from occuring.

Therefore, it is an object of this invention to provides a chain that facilitates the engagement of a chain with a sprocket while shifting.

It is another object of this invention to provide a chain which prevents the chain from skidding off a sprocket when in a highest gear ratio.

It is further an object of this invention to provide a chain which facilitates precise shifting of a rear derailleur.

The invention will be now described with reference to the annexed drawings, showing a preferred embodiment of the invention as an illustrative example.

DETAILED DESCRIPTION OF THE PREFERRED EMBODIMENT

Figure 1:
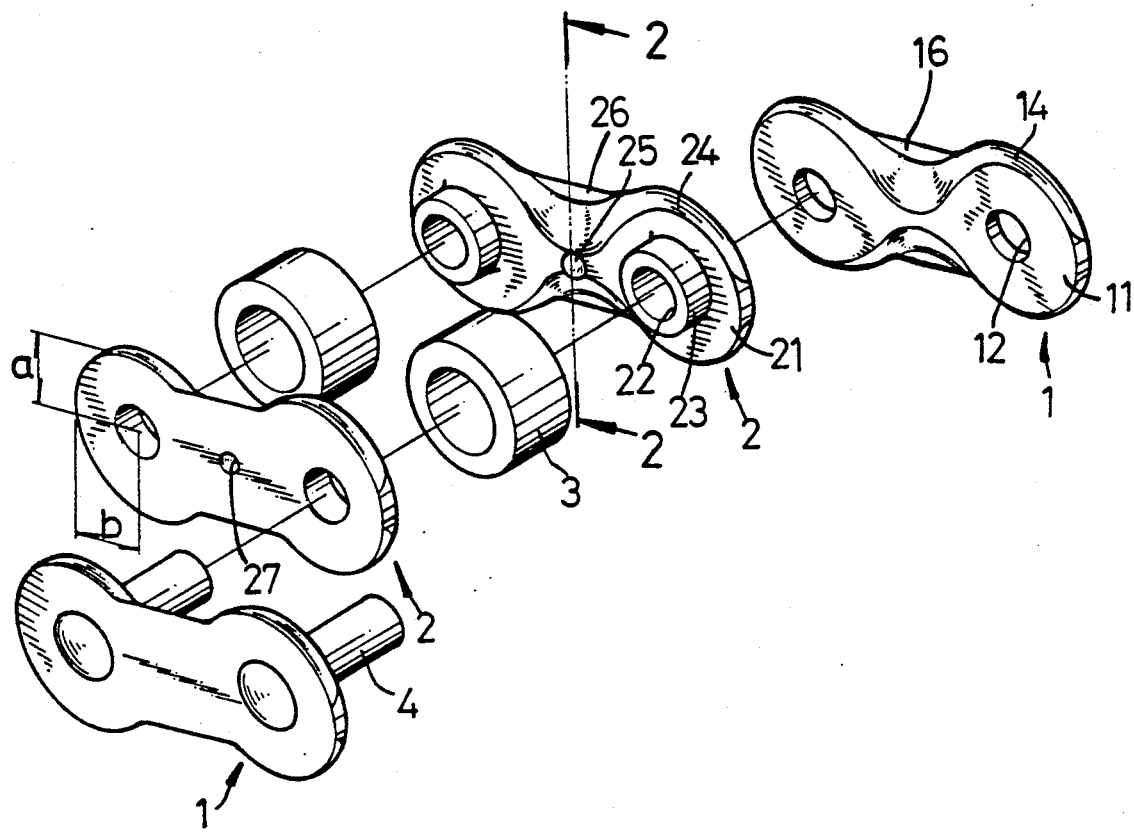
FIG. 1 is an exploded view of a link of a chain in accordance with this invention.

Referring to FIG. 1, an exploded link of a chain in accordance with the present invention is seen. The link of the chain includes a pair of outer chain plates 1, a pair of inner chain plates 2, and a pair of rollers 3.

From a side view, each outer and inner chain plate 1 and 2 is shaped like a dumbbell. On an inner face 11 of each outer chain plate 1 there is provided an inclined surface 14, which extends along an upper and a lower edge of each outer chain plate 1, from one lateral end thereof to another. Thus, in a cross-sectional view of a lateral circular portion of an outer chain plate 1, there is provided upper and lower inclined surfaces 14 on an inner surface and a smooth flat on an outer surface.

At central straight portions of the inner faces 11 of the outer chain plates 1, the inclined surfaces 14 provide blade portions 16. The blade portions 16 substantially comprise outer edges of the central straight portions of the inner faces 11. The blade portions 16 also have a greater slope than the inclined surfaces 14; thus, the outer chain plates 1 provide two successive inclined surfaces at the central straight portion thereof, i.e., the blade portion 16 and the inclined surface 14.

One of the outer chain plates of the link provides a hole connected with an inward chain pin 4 at centers of each circular portion thereof, while the other chain plate provides two corresponding receiving holes 12 to receiving pins 4.

Portions of the inner chain plates 2 corresponding to the outer chain plates 1, and differences thereof, are briefly described below. Circular portions of the inner chain plates 2 have a smaller diameter than that of the outer chain plates 1. A pair of inward protuberant flanges 23 are disposed on each inner chain plate 2, surrounding a central hole 22 on each circular portion thereof. More particularly, in the circular portions, the vertical radius (a) is larger than the horizontal radius (b), such as shown in FIG. 1.

Figure 2:
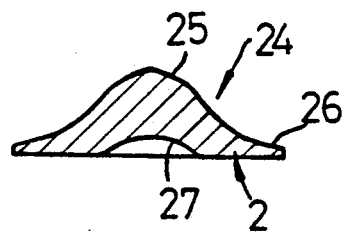
FIG. 2 is a cross-sectional view taken along line 2—2 in FIG. 1.

Further, a second blade portion 26 is provided on an upper straight edge of the inner chain plate 2; therefore, a space between two inner chain plates 2 more easily accommodates an entering sprocket by providing a larger width at the upper straight edge than conventional chains. Additionally, there is provided an inward projection 25 between two second inclined surfaces 24 at a central portion of each inner chain plate 2, while on an outer surface of the inner chain plate 2 there is provided a recess 27 corresponding to the projection 25, especially shown in FIG. 2.

Figure 3:
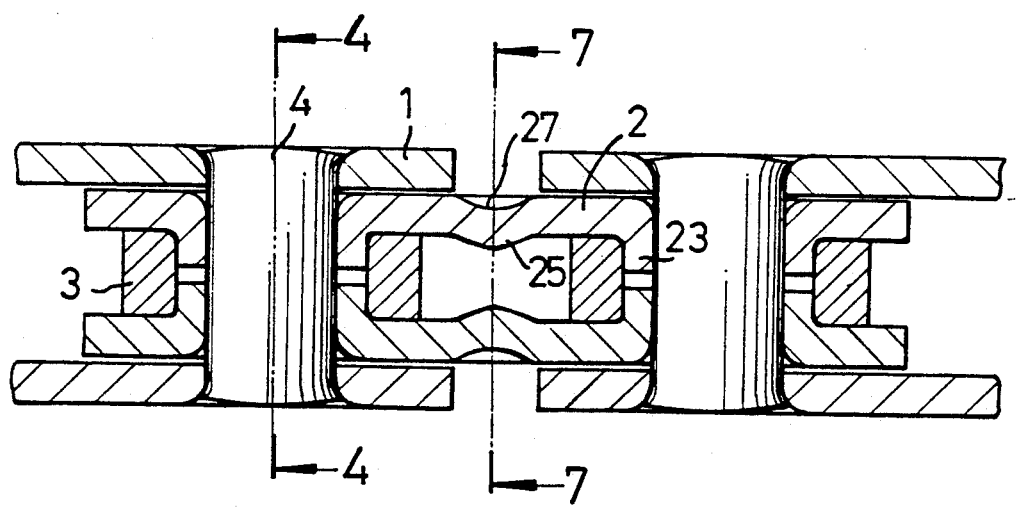
FIG. 3 is a partially longitudinally cross-sectional view in a top plane of a chain according to the present invention.
Figure 4:
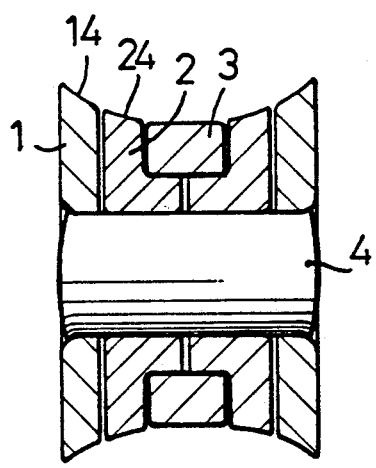
FIG. 4 is a cross-sectional view showing a joint portion of a link of a chain in accordance with this invention.

All elements may be assembled into a link in a conventional manner; thus, at a combined portion the inner and outer chain plates 1 and 2 provide respective inclined surfaces 14 and 24, cooperating with rollers 3, to form a curved surface, such as shown in FIG. 4. At an innermost central portion of each pair of inner chain plates 2, the width between plates is reduced by the projections 25, such as shown in FIG. 3, such that a plurality of links may be combined to form a chain.

Figure 5:
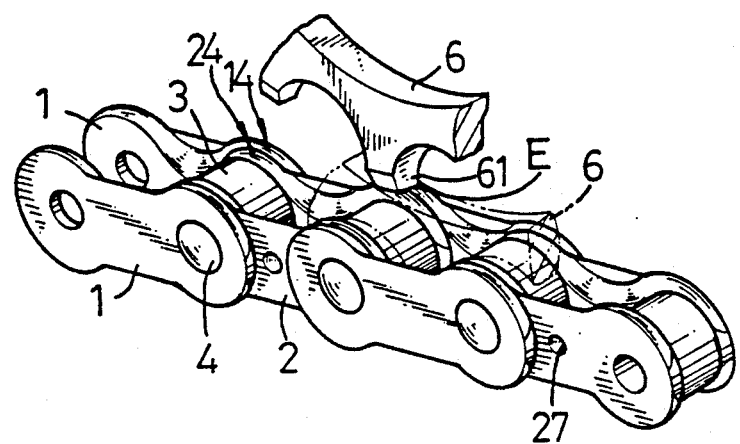
FIG. 5 is a perspective view illustrating a sprocket being inserted into a space between two outer chain plates of a chain according to this invention.
Figure 6:
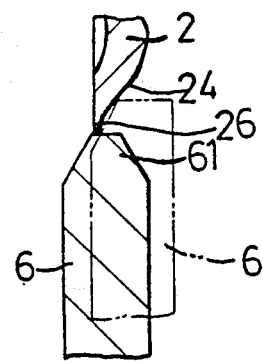
FIG. 6 is a cross-sectional view showing a sprocket abutting a straight portion of an inner chain plate and sliding into a space of a chain.

In operation, referring to FIGS. 5 and 6, a tooth 61 of a sprocket 6 may abut an edge, indicated at E, of the inclined surface 14, and then slide along the curved surface into a space defined by either outer or inner chain plates of the chain to complete shifting.

Additionally, while in a condition of being in the highest gear ratio, and since there is a larger width provided between two chain plates, the tooth 61 of the sprocket 6 may abut an edge of the central straight portion of the inner chain plate 2, causing the tooth 61 to slide from the blade portion 16 through the inclined surface 14 into a space defined by two inner chain plates 2, instead of skidding out and off the chain.

Figure 7:
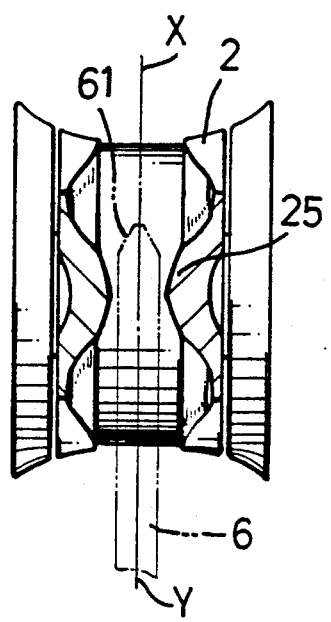
FIG. 7 is a cross-sectional view from line 7—7 of FIG. 3 illustrating an operation of this invention, wherein a tooth of a sprocket is shown in phantom line.
Figure 8:
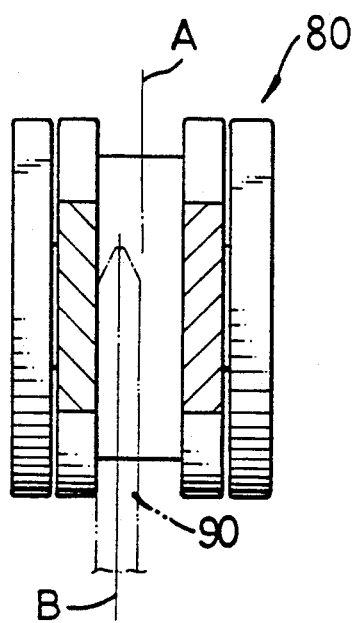
FIG. 8 is a view similar to FIG. 4 according to prior art.

Furthermore, referring to FIG. 7, since the innermost portion of the space defined by two inner chain plates 2 is reduced by the projection 25 formed on each inner chain plate 2 to a width slightly larger than thickness of a sprocket tooth, as the tooth 61 inserts into the space, the projections 25 restrict the tooth 61 in a position to maintain a central line Y of the sprocket 6 to be approximately aligned with a central line X of the link, such that the chain holds the sprocket 6 more stably to prevent the chain from skidding off the sprocket caused by vibration on rugged terrain. More particularly, since the chain is always positioned on a central line of a sprocket, as a rider is shifting, the chain is guided by the rear derailleur more precisely and quickly to a desired sprocket, avoiding any extra loading from an up-and-down motion caused by irregular shifting.

It is to be understood, however, that even though numerous characteristics and advantages of the present invention have been set forth in the foregoing description, together with details of the structure and function of the invention, the disclosure is illustrative only, and changes may be made in detail within the principles of the invention to the full extent indicated by the broad general meaning of the terms in which the appended claim as expressed.

I claim:

1. A chain comprising a plurality of pairs of inner and outer chain plates linked by rollers and pins, wherein the improvement comprises:
    each said inner chain plate having a projection on an innermost central portion thereof to define a width between two inner chain plates slightly larger than thickness of a tooth of a sprocket.

2. A chain as claimed in claim 1, wherein each said chain plate has an inclined surface along upper and lower edges of an inner face thereof and a blade portion merging with said inclined surface at central straight portions thereof, said blade portions having a greater slope than said inclined surfaces, thereby enlarging a width between two inner chain plates.

3. A chain as claimed in claim 2, wherein said inclined surface of said inner chain plate is positioned successive or adjacent to said inclined surface of said outer chain plate to form a curved surface thereon at a junction thereof.

* * * * *